United States Patent [19]

Roberts

[11] Patent Number: 4,676,581

[45] Date of Patent: Jun. 30, 1987

[54] INFRA-RED LENSES

[75] Inventor: Michael Roberts, Clwyd, Wales

[73] Assignee: Pilkington P.E. Limited, United Kingdom

[21] Appl. No.: 851,318

[22] Filed: Apr. 9, 1986

Related U.S. Application Data

[63] Continuation of Ser. No. 526,044, Aug. 24, 1983, abandoned.

[30] Foreign Application Priority Data

Sep. 4, 1982 [GB] United Kingdom ............... 8225277
Apr. 18, 1983 [GB] United Kingdom ............... 8310281

[51] Int. Cl.$^4$ ............................................. G02B 15/20
[52] U.S. Cl. ........................................ 350/1.3; 350/423
[58] Field of Search ................ 350/1.2, 1.3, 416, 423, 350/427, 428, 453, 454, 455–457, 469–473

[56] References Cited

U.S. PATENT DOCUMENTS

| | | | |
|---|---|---|---|
| 3,679,286 | 7/1972 | Klein | 350/427 |
| 4,148,548 | 4/1979 | Thompson | 350/1.3 |
| 4,206,973 | 6/1980 | Ikemori | 350/449 |
| 4,240,699 | 12/1980 | Sato et al. | 350/423 |

FOREIGN PATENT DOCUMENTS 1488472 2/1975 United Kingdom .

OTHER PUBLICATIONS

Mann, "Infrared Zoom Lens System for Target Detection", *Optical Engineering*, vol. 21, No. 4, Jul./Aug. 1982, pp. 786–793.

*Primary Examiner*—Bruce Y. Arnold
*Attorney, Agent, or Firm*—F. Eugene Davis, IV; Mark P. Stone

[57] ABSTRACT

An infra-red objective zoom lens has a fixed front positive singlet, a movable negative component, a movable positive singlet and a fixed rear component. The zoom lens can be relatively short and can be used with an "eye-piece" lens to form an infra-red afocal telescope. The system can be further shortened by using a rear group of telephoto form. The fixed front positive singlet is shaped so that at high magnification it gives undercorrected third and fifth order spherical aberration, and the moveable negative component has at least one lens element shaped so that at high magnification the negative component gives compensating overcorrected third and fifth order spherical aberration.

21 Claims, 12 Drawing Figures

INFRA-RED LENSES

This application is a continuation of application Ser. No. 526,044, filed Aug. 24, 1983, now abandoned.

BACKGROUND OF THE INVENTION

This invention concerns improvements in or relating to infra-red lenses and relates more particularly to an infra-red zoom lens.

There is a requirement for infra-red zoom lenses providing variable magnification for example up to ×20 or more. Such a lens can be used, in particular, as an objective lens in combination with an "eye-piece" lens to provide an afocal zoom telescope. To date, however, there have been limitations on the use of continuous zoom lenses in some infra-red applications because of the excessive length of the lens.

SUMMARY OF THE INVENTION

According to the present invention there is provided an infra-red objective zoom lens comprising a fixed front lens component which at high magnification gives under-corrected third and fifth order spherical aberration, a negative lens component which is movable relative to said front lens component and which at high magnification gives compensating over-correct third and fifth order spherical aberration, a positive lens component which is movable relative to said front lens component and said negative lens component, and a rear lens component fixed relative to said front lens component. Said negative lens component and said positive lens component which are movable with respect to said front lens component provide a zoom lens of the mechanically compensated type. It will be understood that the term "fixed" when used in relation to the front and rear components is not intended to exclude a degree of adjustability e.g. for focussing purposes, but means that these components remain in fixed relationship to each other when the movable components are moved to alter the magnification setting.

Preferably said front lens component consists of a singlet lens element of positive power which is the largest diameter element of the lens. Said negative component preferably comprises a group of lens elements which preferably consists of two lens elements each of negative power; one, preferably the front, of the two elements may be of a dispersive material to effect achromatisation. Said positive component preferably consists of a positively powered singlet lens element. Said rear component preferably comprises a group of, for example two, lens elements with the front element preferably of positive power and the rear element preferably of negative power. The powers and spacing of such positive and negative rear component elements can provide a telephoto effect, which can be increased, with resultant shortening of the overall system, by increasing the powers of and spacing between these elements.

The infra-red objective zoom lens is particularly suitable for use in conjunction with an "eye-piece" lens in an infra-red afocal telescope. The "eye-piece" lens is preferably of a type which corrects pupil aberrations and thereby reduces the necessary diameter of the objective lens at high magnification.

In this specification the terms "front" and "rear" are used in the sense that the front of the lens faces towards the object and the rear of the lens faces towards the exit pupil. Further, the term "eye-piece" is used although the ultimate image is not viewed by the human eye but is, for example, scanned across an infra-red detector array, and the term is to be construed accordingly.

The lens may be designed to operate within the 3 to 13 micron waveband, and more particularly the 8 to 13 micron waveband, and the materials of the lens elements are selected accordingly to have a useful transmission of radiation at the relevant wavelengths. The spaces between the solid elements are preferably occupied by gas, and conveniently air. The refracting surfaces of the lens elements are preferably all of spherical curvature.

BRIEF DESCRIPTION OF THE DRAWING

Preferred embodiments of the invention will now be described, by way of example, with reference to the accompanying drawings in which.

DESCRIPTION OF THE PREFERRED EMBODIMENTS OF THE INVENTION

Figure 1:
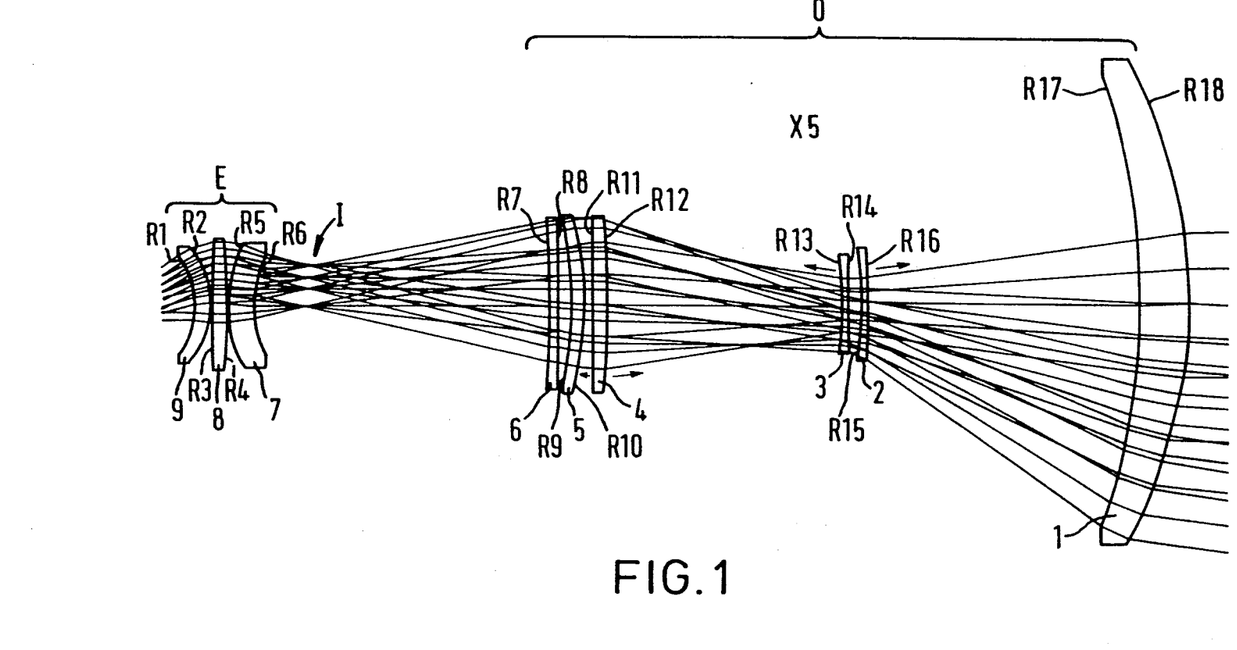
FIG. 1 is a schematic representation of a first embodiment of infra-red afocal telescope having an objective zoom lens set to achieve a ×5 magnification.
Figure 2:
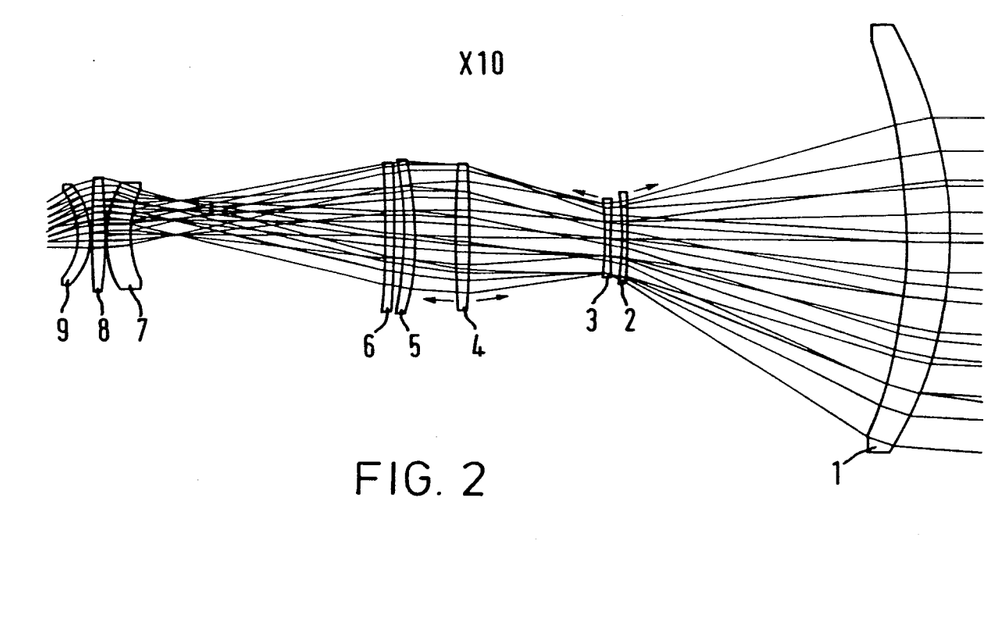
FIGS. 2, 3 and 4 are schematic representations to a different scale of the embodiment of FIG. 1 with the zoom lens set to achieve ×10, ×15 and ×20 magnification respectively.
Figure 3:
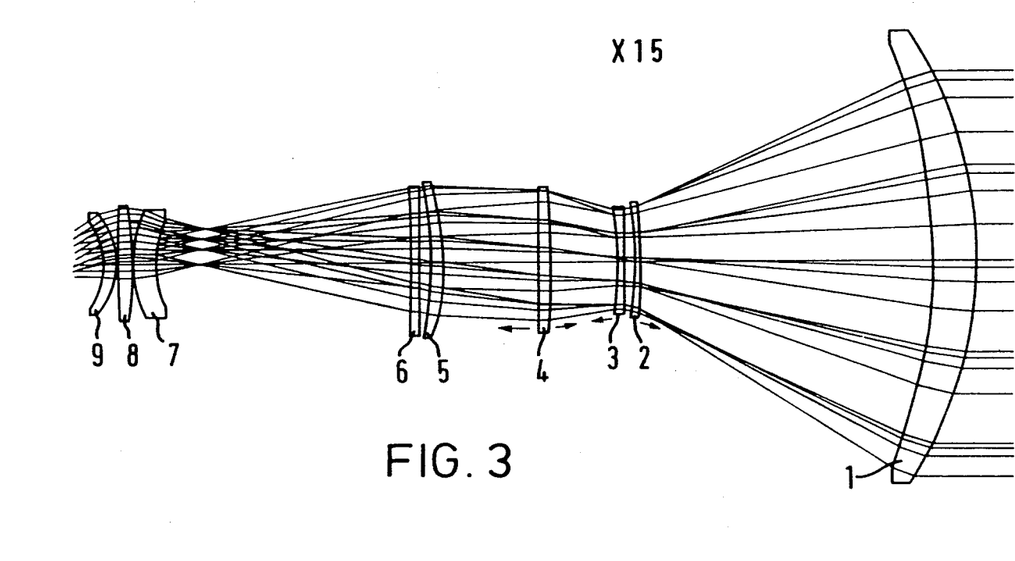
Figure 4:
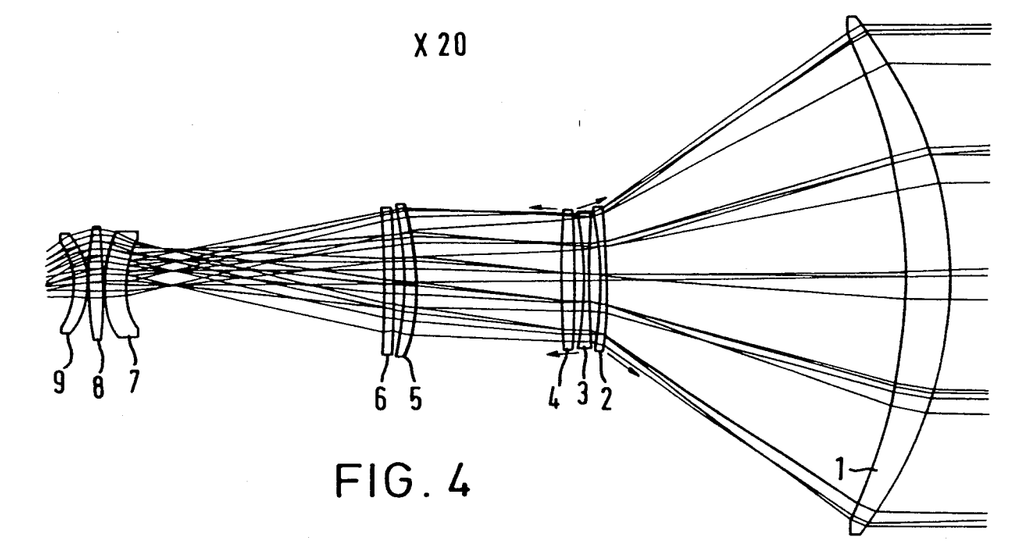

The infra-red afocal zoom telescope shown in FIGS. 1 to 4 comprises an "eye-piece" lens generally indicated as E and an objective zoom lens generally indicated as O. The objective lens produces an intermediate real image, indicated as I, which is "viewed" through the "eye-piece" lens.

The objective lens comprises a fixed front component consisting of a singlet lens element 1 which is a meniscus element of positive power with its convex surface facing forwardly. The element 1 gives under-corrected third and fifth order spherical aberration at high (e.g. ×20) magnification, and is the largest diameter lens element of the entire system.

Behind the element 1 is a negative component group consisting of two negative lens elements 2 and 3. The front element 2 is meniscus convex towards the front and the back element 3 of the group is bi-concave. The front element 2 is of a dispersive material such that it effects achromatisation. The elements 2 and 3 are mounted in fixed relationship one relative to the other but are movable as a group in an axial direction relative to the front element 1.

Behind the negative group formed by elements 2 and 3 is a positive component provided by a bi-convex singlet element 4. This element 4 is movable relative to the front element 1 and relative to the elements 2 and 3. The positive element 4 and the negative group formed by elements 2 and 3 thus provide a continuous zooming facility of the mechanically compensated type whereby different magnifications can be achieved. It will be seen by comparison of the four figures of the drawings that these elements occupy different positions at the different respective magnification settings.

Behind the element 4 is a fixed rear component comprising a group consisting of two elements 5 and 6 in fixed relationship to each other. The front element 5 of the two is meniscus convex towards the front and of positive power, while the back element 6 of the two is also meniscus with its convex surface facing forwardly, but of negative power. The elements 5 and 6 in combination provide a group of positive power which is mounted so that its position is fixed relative to the front element 1, i.e. the elements 1, 5 and 6 remain in the same relative positions at the different magnification settings achieved by movement of the elements 2, 3 and 4. It will be appreciated, however, that one or more of the elements 1, 5 and 6 may be adjustable in position, for example to effect proper initial focussing of the lens.

The third and fifth order under-correct spherical aberration introduced at high magnification by the front element 1 is compensated by third and fifth order overcorrect spherical aberration of the negative group formed from elements 2 and 3. In this manner the objective lens can comprise relatively high powered lens elements but the aberrations can be controlled to an acceptable level thus permitting a relatively compact size of lens.

The "eye-piece" lens E is such as to control pupil aberrations and thereby enables the diameter of the objective lens, and in particular the front element 1, to be reduced for high magnifications. The "eye-piece" lens consists of a front meniscus element 7 with its concave surface facing forwardly and which has positive power, followed by a bi-convex central element 8 of positive power, and a rear meniscus element 9 with its convex surface facing forwardly of positive power.

A particular example of lens in accordance with the FIGS. 1 to 4 embodiment has numerical data as follows, the refractive surfaces from the back of the lens to the front being indicated successively as R1 to R18, and the dimensional units being millimeters. Example 1:

| Surface | Radius of Curvature | Axial Thickness/ Separation |
|---|---|---|
| R1 | −34.03 | |
| | | 6.01 |
| R2 | −33.47 | |
| | | 0.50 |
| R3 | 323.76 | |
| | | 5.71 |
| R4 | −313.25 | |
| | | 0.50 |
| R5 | 50.37 | |
| | | 9.91 |
| R6 | 43.79 | |
| | | 111.76 |
| R7 | −563.83 | |
| | | 3.81 |
| R8 | −1118.60 | |
| | | 4.32 |
| R9 | −183.70 | |
| | | 5.64 |
| R10 | −117.49 | |
| | | Variable |
| R11 | 1839.79 | |
| | | 5.51 |
| R12 | −443.25 | |

-continued

| Surface | Radius of Curvature | Axial Thickness/ Separation |
|---|---|---|
| R13 | −173.46 | |
| | | 2.50 |
| R14 | 490.58 | |
| | | 5.01 |
| R15 | −157.56 | |
| | | 2.50 |
| R16 | −301.47 | |
| | | Variable |
| R17 | −255.55 | |
| | | 19.04 |
| R18 | −188.47 | |

It will be understood that the axial separations indicated as variable depend on the magnification setting. With the illustrated magnifications these axial separations are as follows:

| Separation | Magnification | | | |
|---|---|---|---|---|
| | ×5 | ×10 | ×15 | ×20 |
| R10/R11 | 2.99 | 17.50 | 40.90 | 63.67 |
| R12/R13 | 90.21 | 58.07 | 29.06 | 3.64 |
| R16/R17 | 103.89 | 121.52 | 127.14 | 129.79 |

In the above example all the lens elements are of Germanium except for the achromatising element 2 which is of Zinc Selenide, although another suitable dispersive material such as Chalcogenide glass designated "BS1" (manufactured by Barr and Stroud Limited) could be used if desired. The spaces between the solid lens elements are air. The focal lengths of the respective lens elements, are as follows.

| Element | Focal Length |
|---|---|
| 9 | 74.84 |
| 8 | 53.37 |
| 7 | 856.75 |
| 6 | −380.51 |
| 5 | 102.02 |
| 4 | 119.15 |
| 3 | −42.55 |
| 2 | −237.08 |
| 1 | 197.09 |

The "eye-piece" lens E, consisting of elements 9, 8 and 7, has a focal length of 24.19, the pair of elements 8 and 7 having a focal length of 43.37. The fixed rear positive group or component consisting of elements 6 and 5 has a focal length of 134.60. The movable negative group or component consisting of elements 3 and 2 has a focal length of −35.53. It will be understood that the focal length of the objective lens O, consisting of elements 1, 2, 3, 4, 5, 6, as a whole is dependent on the magnification setting but will be approximately the "eye-piece" focal length multiplied by the magnification.

The refractive surfaces R1 to R18 in the above example are all of spherical curvature, and the lens is designed to operate over the 8 to 13 micron waveband.

A further example in accordance with the FIGS. 1 to 4 embodiment designed to operate over the 8 to 13 micron waveband, having air spaced elements 1 and 3 to 9 of Germanium and element 2 of Zinc Selenide, and employing refractive surfaces all of spherical curvature has numerical data as follows. Example 2:

| Surface | Radius of Curvature | Axial Thickness/ Separation |
|---|---|---|
| R1 | −33.71 | |
| | | 6.00 |
| R2 | −33.71 | |
| | | 0.50 |
| R3 | PLANO | |
| | | 5.72 |
| R4 | −164.59 | |
| | | 0.50 |
| R5 | 50.19 | |
| | | 9.82 |
| R6 | 44.98 | |
| | | 112.70 |
| R7 | −541.84 | |
| | | 3.80 |
| R8 | −1125.89 | |
| | | 3.64 |
| R9 | −170.87 | |
| | | 5.50 |
| R10 | −112.72 | |
| | | Variable |
| R11 | 3661.53 | |
| | | 5.30 |
| R12 | −384.81 | |
| | | Variable |
| R13 | −188.25 | |
| | | 2.50 |
| R14 | 376.86 | |
| | | 5.97 |
| R15 | −130.81 | |
| | | 3.50 |
| R16 | −218.43 | |
| | | Variable |
| R17 | −260.31 | |
| | | 18.00 |
| R18 | −188.25 | |

With this example the "variable" separations at the respective illustrated magnifications are as follows:

| Separation | Magnification | | | |
|---|---|---|---|---|
| | ×5 | ×10 | ×15 | ×20 |
| R10/R11 | 3.05 | 21.53 | 46.17 | 69.43 |
| R12/R13 | 92.90 | 58.58 | 28.95 | 3.27 |
| R16/R17 | 101.15 | 117.00 | 121.98 | 124.40 |

It will be seen that in this further example the element 8 is plano-convex rather than bi-convex as shown in FIGS. 1 to 4 and in the previous example. In both examples the axial distance from the rear surface R1 to the exit pupil is 23.11. In Example 2 the fixed rear lens group or component consisting of elements 6 and 5 is of positive power and has a focal length of +140.71 mm.

Figure 5:
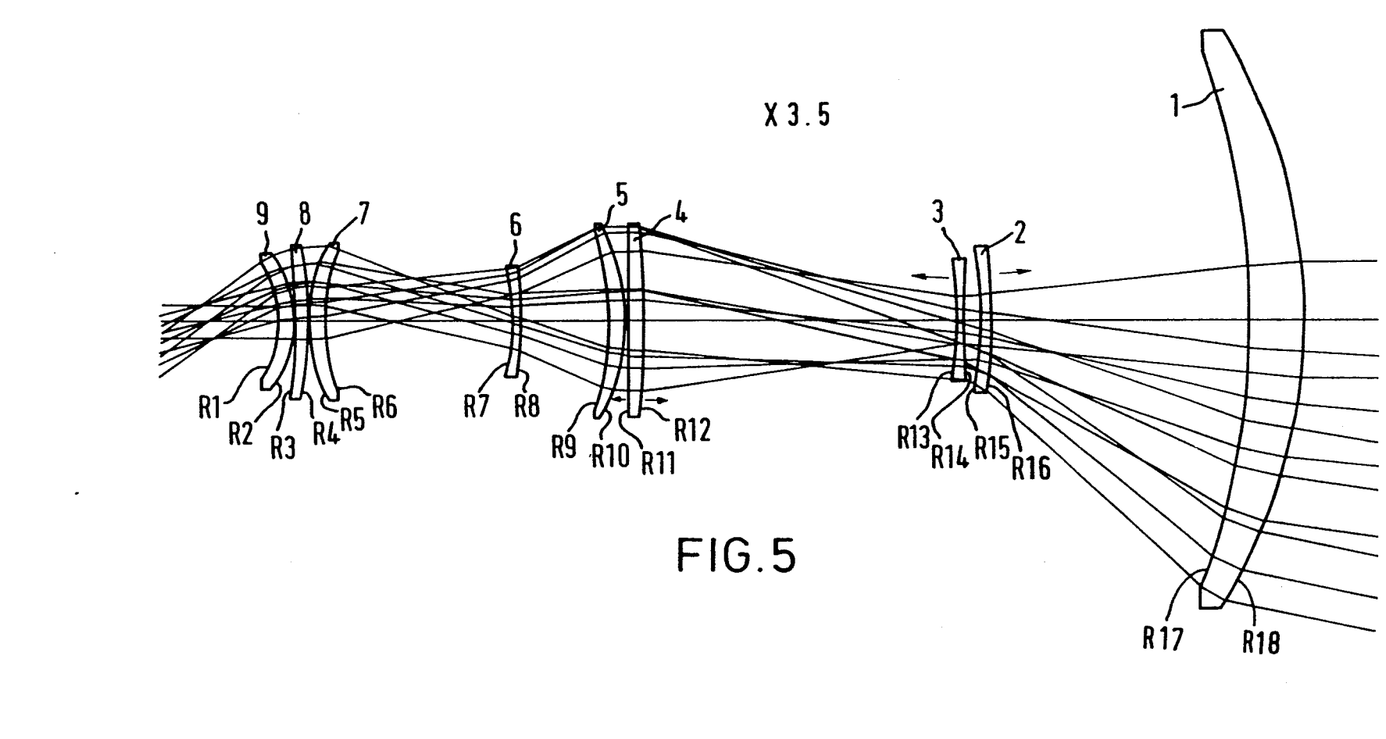
FIG. 5 is a schematic representation of a second embodiment of infra-red afocal telescope having an objective zoom lens set to achieve a ×3.5 magnification.
Figure 6:
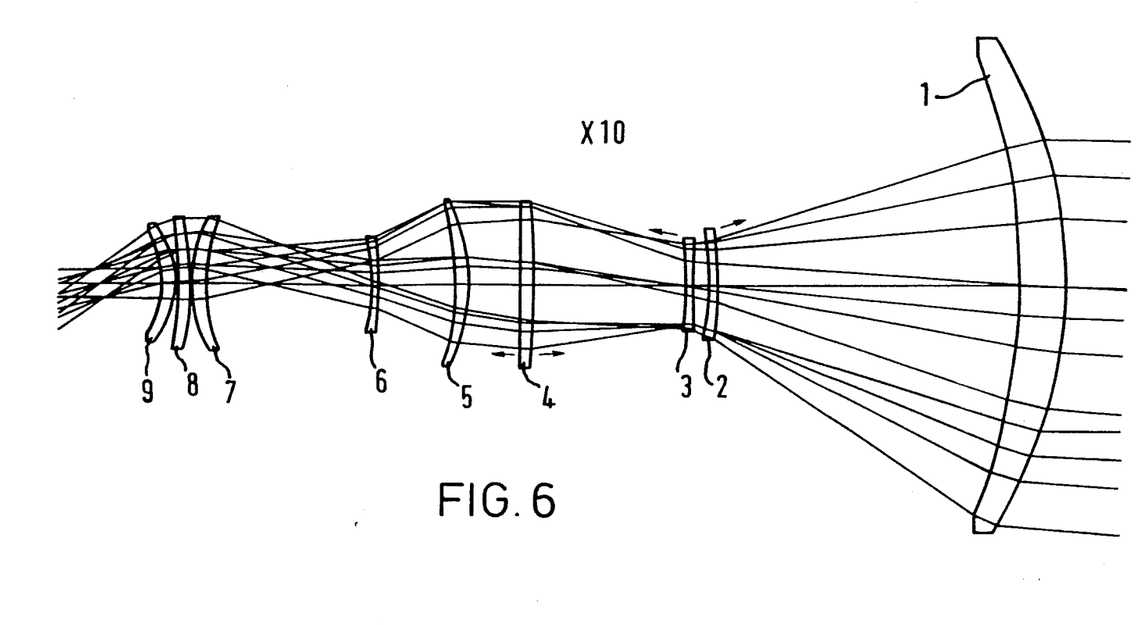
FIGS. 6, 7 and 8 are schematic representations to a different scale of the embodiment of FIG. 5 with the zoom lens set to achieve ×10, ×15 and ×20 magnification respectively.
Figure 7:
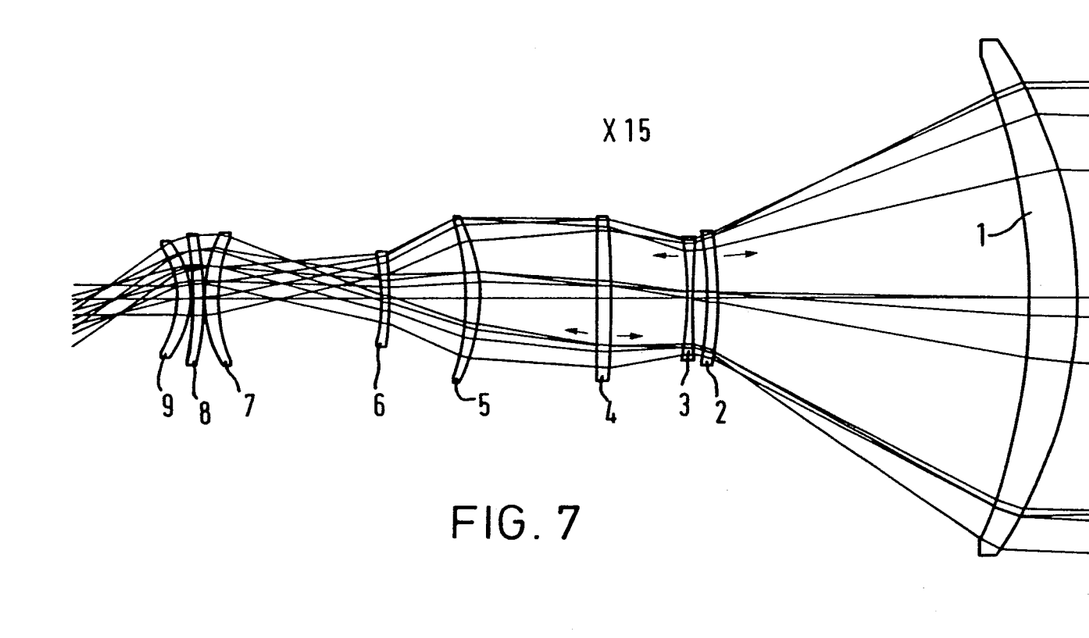
Figure 8:
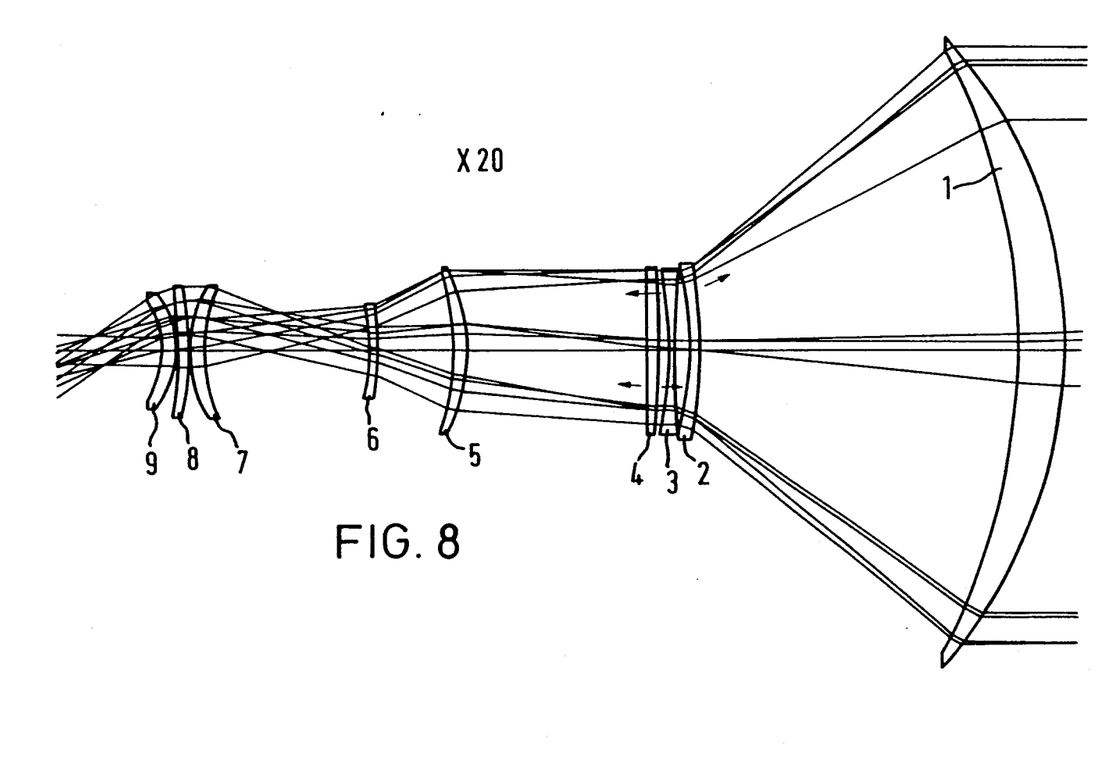

In the embodiment shown in FIGS. 5 to 8 the same references are used as for the embodiment of FIGS. 1 to 4, there being from front to back lens elements 1 to 6 forming the objective zoom lens and lens elements 7 to 9 forming an 'eye-piece' lens, the objective and 'eye-piece' lenses together providing an afocal zoom telescope. The basic power signs, shapes and functions of the respective lens elements are the same as in the embodiment of FIGS. 1 to 4 except that the central element 8 in the 'eye-piece' is meniscus convex towards the front. The refractive surfaces from the back to the front are again indicated successively as R1 to R18.

The embodiment of FIGS. 5 to 8 illustrates use of a telephoto effect in the rear lens component. As will be understood by those skilled in the art, the telephoto effect is achieved by the positive and negative powers of the elements 5 and 6 and the spacing between them. In the following example in accordance with the embodiment of FIGS. 5 to 8 the spacing between the elements 5 and 6, i.e. between the surfaces R8 and R9, and the absolute powers of the elements 5 and 6 are greater than in the previous examples and the telephoto effect is thus enhanced. In the following example the positive element 5 has a focal length of +63.33 mm, the negative element 6 has a focal length of −45.70 mm, and the rear lens component consisting of elements 5 and 6 together has a focal length of +189.93 mm. The dimensional units are millimeters. Example 3:

| Surface | Radius of Curvature | Axial Thickness/ Separation |
|---|---|---|
| R1 | −37.54 | |
| | | 4.95 |
| R2 | −36.25 | |
| | | 0.38 |
| R3 | −218.10 | |
| | | 4.45 |
| R4 | −116.37 | |
| | | 0.38 |
| R5 | +52.18 | |
| | | 5.08 |
| R6 | +66.34 | |
| | | 59.97 |
| R7 | −71.63 | |
| | | 2.54 |
| R8 | −153.81 | |
| | | 28.12 |
| R9 | −100.72 | |
| | | 5.08 |
| R10 | −68.34 | |
| | | Variable |
| R11 | +3234.22 | |
| | | 4.98 |
| R12 | −361.73 | |
| | | Variable |
| R13 | −176.05 | |
| | | 2.35 |
| R14 | +347.35 | |
| | | 5.61 |
| R15 | −125.10 | |
| | | 3.29 |
| R16 | −204.69 | |
| | | Variable |
| R17 | −244.76 | |
| | | 17.40 |
| R18 | −177.07 | |

The lens elements are all of germanium, except for the achromatizing element 2 which is of Zinc Selenide, and the spaces between the solid lens elements are air. The lens is designed to operate in the 8 to 13 micron waveband. The refracting surfaces are all of spherical curvature. The axial distance from the rear surface R1 to the exit pupil is 23.11 mm.

The axial separations indicated as variable depend on the magnification setting, and are as follows with the indicated magnifications.

| Separation | Magnification | | | |
|---|---|---|---|---|
| | ×3.5 | ×10 | ×15 | ×20 |
| R10/11 | 0.82 | 18.91 | 43.26 | 65.65 |
| R12/13 | 101.40 | 56.55 | 27.95 | 3.43 |
| R16/17 | 83.16 | 109.91 | 114.17 | 116.30 |

FIGS. 5 to 8 illustrate the enhanced telephoto effect resulting from the greater spacing between the fixed elements 5 and 6 of the rear lens component, which permits a shorter physical length for the overall system, such greater spacing being accompanied by greater powers of the elements 5 and 6 as explained above.

Figure 9:
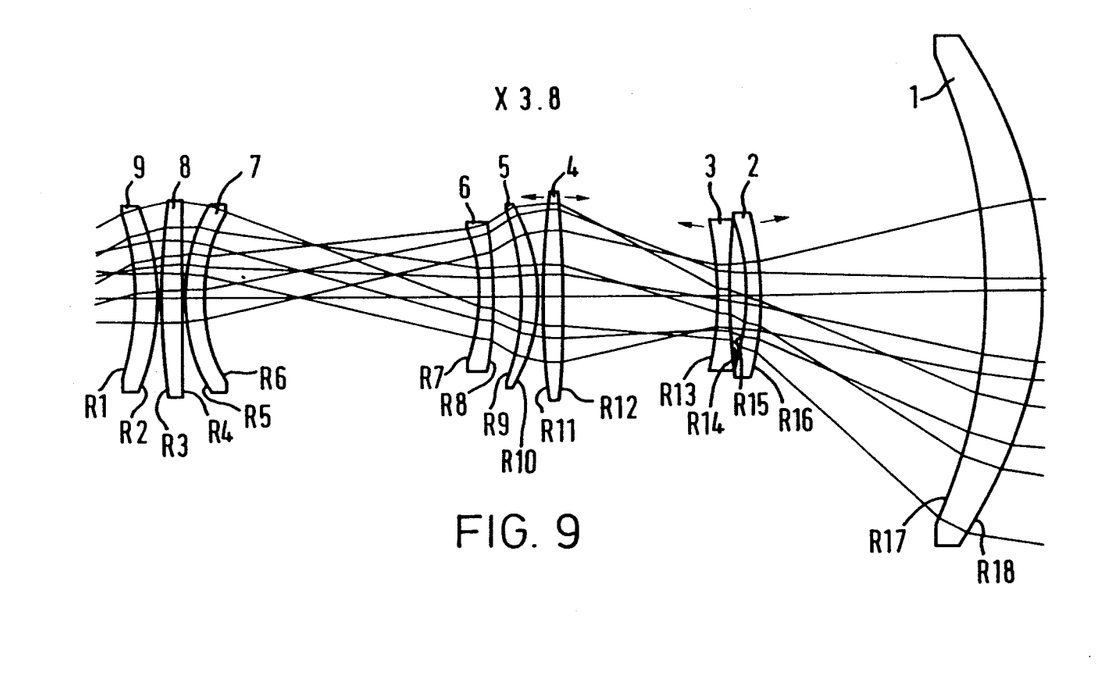
FIG. 9 is a schematic representation of a third embodiment of infra-red afocal telescope having an objective zoom lens set to achieve a ×3.8 magnification.
Figure 10:
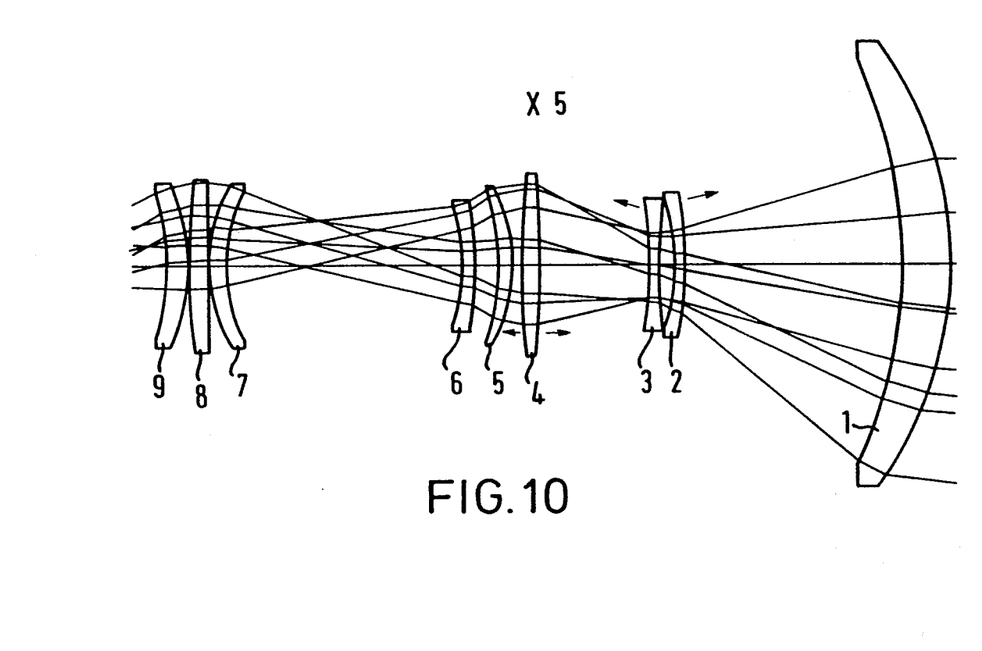
FIGS. 10, 11 and 12 are schematic representations to a different scale of the embodiment of FIG. 9 with the zoom lens set to achieve ×5, ×7.5 and ×10 magnifications respectively.
Figure 11:
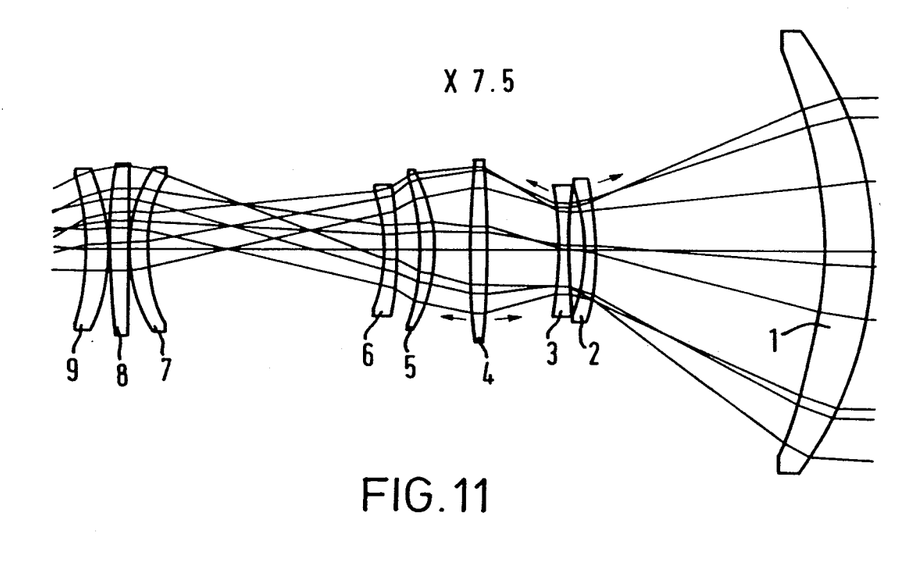
Figure 12:
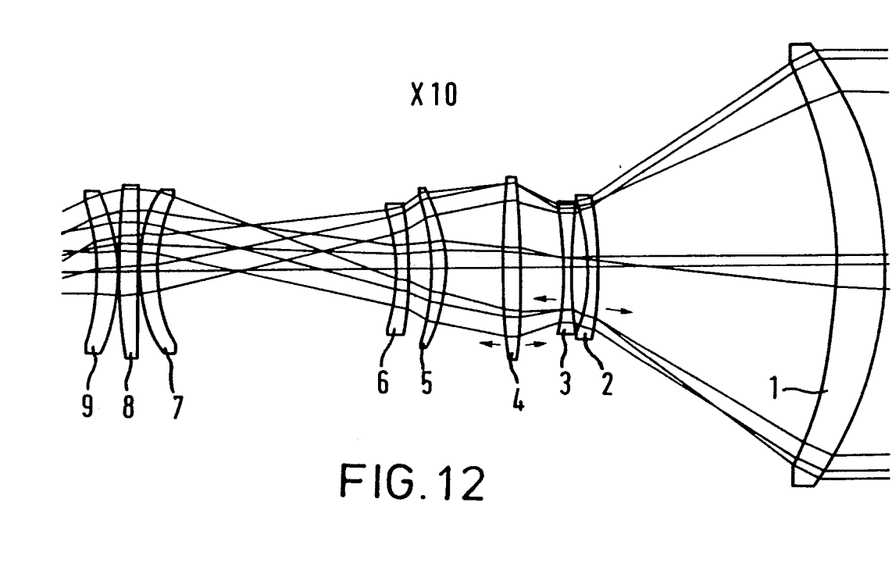

The embodiment shown in FIGS. 9 to 12 has lens elements whose basic power signs, shapes and functions are the same as in the embodiment of FIGS. 1 to 4 and the same references are used. However, in the FIGS. 9 to 12 embodiment the fixed rear component consisting of elements 5 and 6 is of negative power whereas in the embodiment of FIGS. 1 to 4, and that of FIGS. 5 to 8, it is of positive power.

A particular example in accordance with the embodiment of FIGS. 9 to 12 is given below, and in that example the positive element 5 has a focal length of +39.04 mm, the negative element 6 has a focal length of −29.17 mm, and the rear lens component consisting of elements 5 and 6 together has a focal length of −5513.06 mm. The dimensional units are millimeters and the solid lens elements are of the same materials as in the previous examples and are air spaced, this example likewise being designed to operate in the 8 to 13 micron waveband. Again, the refracting surfaces are all of spherical curvature. Example 4:

| Surface | Radius of Curvature | Axial Thickness/ Separation |
| --- | --- | --- |
| R1 | −60.03 | |
| | | 4.95 |
| R2 | −48.51 | |
| | | 0.38 |
| R3 | +163.75 | |
| | | 4.32 |
| R4 | +1442.83 | |
| | | 0.38 |
| R5 | +38.45 | |
| | | 3.94 |
| R6 | +41.63 | |
| | | 55.68 |
| R7 | −45.15 | |
| | | 2.92 |
| R8 | −97.71 | |
| | | 5.80 |
| R9 | −55.77 | |
| | | 3.30 |
| R10 | −39.47 | |
| | | Variable |
| R11 | +193.26 | |
| | | 4.32 |
| R12 | −209.20 | |
| | | Variable |
| R13 | −87.84 | |
| | | 2.29 |
| R14 | +153.02 | |
| | | 3.68 |
| R15 | −48.09 | |
| | | 2.54 |
| R16 | −80.31 | |
| | | Variable |
| R17 | −121.13 | |
| | | 11.68 |
| R18 | −90.01 | |

The axial separations indicated as variable depend on the magnification setting and are as follows at the indicated magnifications:

| Separations | Magnification | | | |
| --- | --- | --- | --- | --- |
| | ×3.8 | ×5 | ×7.5 | ×10 |
| R10/R11 | 1.02 | 2.10 | 8.16 | 13.55 |
| R12/R13 | 30.56 | 25.83 | 16.98 | 10.03 |
| R16/R17 | 46.61 | 50.26 | 53.05 | 54.60 |

The axial distance from the rear surface R1 to the exit pupil is 23.11.

The focal lengths of the respective individual lens elements in Examples 2, 3 and 4, are as follows:

| Element | Focal Length | | |
| --- | --- | --- | --- |
| | Example 2 | Example 3 | Example 4 |
| 9 | +84.04 | +90.55 | +63.61 |
| 8 | +54.80 | +80.43 | +61.35 |
| 7 | +348.01 | +64.12 | +86.86 |
| 6 | −349.51 | −45.70 | −29.17 |
| 5 | +102.98 | +63.33 | +39.04 |
| 4 | +116.06 | +108.44 | +33.72 |
| 3 | −41.66 | −38.77 | −18.45 |
| 2 | −237.39 | −234.40 | −89.35 |
| 1 | +190.71 | +178.72 | +91.01 |

The focal lengths of the "eye-piece" lens E consisting of elements 9, 8 and 7, of the pair of elements 8 and 7, and of the movable negative group or component consisting of elements 3 and 2, are as follows:

| Group | Focal Length | | |
| --- | --- | --- | --- |
| | Example 2 | Example 3 | Example 4 |
| E | +24.64 | +23.40 | +21.33 |
| 8/7 | +41.52 | +34.59 | +34.88 |
| 3/2 | −34.92 | −32.81 | −14.96 |

It will be appreciated that the particular embodiments shown and described, and the examples in accordance therewith, are given by way of illustration and example and are not limitative on the invention in its broadest aspect. Thus various modifications and alterations to these embodiments and examples may be made by those skilled in the art without departing from the scope of the invention. In particular, although the fixed front lens component and the movable positive lens component are preferably respective singlet elements, either or both could consist of a group of lens elements. It will be apparent and understood by those skilled in the art that two lens elements can be considered to form a 'group' and that term is to be construed accordingly to mean two, or more, lens elements where the context permits. Conversely, although the movable negative lens component and the fixed rear lens component preferably each consist of a group of lens elements, a singlet lens element could be used for either or both of these components. As explained above, however, the use of a group of two elements providing a telephoto effect for the rear component can of itself contribute to a shorter overall system and can therefore be advantageous in achieving a further shortening. As will also be seen from the above, this fixed rear lens component may be of positive power, as in the embodiments of FIGS. 1 to 8 and Examples 1 to 3 in accordance therewith, or may be of negative power, as in the embodiment of FIGS. 9 to 12 and Example 4 in accordance therewith. Further, although spherical curvature is preferrred for all the refracting surfaces of the lens, one or more aspheric surfaces could be employed if desired. Yet further, a lens in accordance with the invention could be designed, with use of appropriate materials, to operate over an infra-red waveband other than 8 to 13 microns, and in particular over the 3 to 5.5 micron waveband.

I claim:

1. An infra-red objective zoom lens comprising a series of axially spaced singlet elements arranged to provide:

a fixed front lens component having at least one lens element shaped so that at high magnification the fixed front lens component gives under-corrected third and fifth order spherical aberration, a negative lens component which is movable relative to said front lens component and which has at least one lens element shaped so that at high magnification the negative lens component gives compensating over-corrected third and fifth order spherical aberration, a positive lens component which is disposed behind said negative lens component and is movable relative to said front lens component and said negative lens component, and a rear lens component fixed relative to said front lens component.

2. A lens according to claim 1 in which said front lens component consists of a singlet lens element of positive power which is the largest diameter lens element of the infra-red objective zoom lens.

3. An infra-red objective zoom lens according to claim 1 in whih said negative component comprises a group of lens elements.

4. An infra-red objective zoom lens according to claim 3 in which said group of lens elements consists of two lens elements of negative power.

5. An infra-red objective zoom lens according to claim 4 in which one of said two lens elements is constructed of a dispersive material to effect achromatisation.

6. An infra-red objective zoom lens according to claim 5 in which the front element of said two lens elements is constructed of a dispersive material to effect achromatisation.

7. An infra-red objective zoom lens according to claim 1 in which said positive component consists of a positively powered singlet lens element.

8. An infra-red objective zoom lens according to claim 1 in which said rear component comprises a group of lens elements.

9. An infra-red objective zoom lens according to claim 8 in which said rear component comprises two lens elements.

10. An infra-red objective zoom lens according to claim 9 in which the front element of the rear component is of positive power and the rear element of the rear component is of negative power.

11. An infra-red objective zoom lens according to claim 10 in which the powers and spacing of the rear component elements provide a telephoto effect.

12. An infra-red objective zoom lens according to claim 1 in which the refracting surfaces of the lens elements are all of spherical curvature.

13. An infra-red objective zoom lens according to claim 12 having lens elements from the back of the objective zoom lens to the front with refractive surfaces R7 to R18 having radii of curvature and axial separations substantially as follows:

| Surface | Radius of Curvature | Axial Separation |
|---|---|---|
| R7 | −563.83 | |
| | | 3.81 |
| R8 | −1118.60 | |
| | | 4.32 |
| R9 | −183.70 | |
| | | 5.64 |
| R10 | −117.49 | |
| | | Variable |
| R11 | 1839.79 | |
| | | 5.51 |
| R12 | −443.25 | |
| | | Variable |
| R13 | −173.46 | |
| | | 2.50 |
| R14 | 490.58 | |
| | | 5.01 |
| R15 | −157.56 | |
| | | 2.50 |
| R16 | −301.47 | |
| | | Variable |
| R17 | −255.55 | |
| | | 19.04 |
| R18 | −188.47 | |

14. An infra-red objective zoom lens according to claim 12 having lens elements from the back of the objective zoom lens to the front with refractive surfaces R7 to R18 having radii of curvature and axial separations substantially as follows:

| Surface | Radius of Curvature | Axial Separation |
|---|---|---|
| R7 | −541.84 | |
| | | 3.80 |
| R8 | −1125.89 | |
| | | 3.64 |
| R9 | −170.87 | |
| | | 5.50 |
| R10 | −112.72 | |
| | | Variable |
| R11 | 3661.53 | |
| | | 5.30 |
| R12 | −384.81 | |
| | | Variable |
| R13 | −188.25 | |
| | | 2.50 |
| R14 | 376.86 | |
| | | 5.97 |
| R15 | −130.81 | |
| | | 3.50 |
| R16 | −218.43 | |
| | | Variable |
| R17 | −260.31 | |
| | | 18.00 |
| R18 | −188.25 | |

15. An infra-red objective zoom lens according to claim 12 having lens elements from the back of the objective zoom lens to the front with refractive surfaces R7 to R18 having radii of curvature and axial separations substantially as follows:

| Surfaces | Radius of Curvature | Axial Separation |
|---|---|---|
| R7 | −71.63 | |
| | | 2.54 |
| R8 | −153.81 | |
| | | 28.12 |
| R9 | −100.72 | |
| | | 5.08 |
| R10 | −68.34 | |
| | | Variable |
| R11 | +3234.22 | |
| | | 4.98 |
| R12 | −361.73 | |
| | | Variable |
| R13 | −176.05 | |
| | | 2.35 |
| R14 | +347.35 | |
| | | 5.61 |
| R15 | −125.10 | |
| | | 3.29 |

-continued

| Surfaces | Radius of Curvature | Axial Separation |
|---|---|---|
| R16 | −204.69 | |
| | | Variable |
| R17 | −244.76 | |
| | | 17.40 |
| R18 | −177.07 | |

16. An infra-red objective zoom lens according to claim 12 having lens elements from the back of the objective zoom lens to the front with refractive surfaces R7 to R18 having radii of curvature and axial separations substantially as follows:

| Surface | Radius of Curvature | Axial Separation |
|---|---|---|
| R7 | −45.15 | |
| | | 2.92 |
| R8 | −97.71 | |
| | | 5.80 |
| R9 | −55.77 | |
| | | 3.30 |
| R10 | −39.47 | |
| | | Variable |
| R11 | +193.26 | |
| | | 4.32 |
| R12 | −209.20 | |
| | | Variable |
| R13 | −87.84 | |
| | | 4.29 |
| R14 | +153.02 | |
| | | 3.68 |
| R15 | −48.09 | |
| | | 2.54 |
| R16 | −80.31 | |
| | | Variable |
| R17 | −121.13 | |
| | | 11.68 |
| R18 | −90.01 | |

17. An infra-red afocal telescope having an objective zoom lens in accordance with claim 1 in combination with an 'eye-piece' lens.

18. An infra-red afocal telescope according to claim 17 having lens elements from the back of the objective zoom lens of the telescope to the front with refractive surfaces R1 to R18 of spherical curvature with radii of curvature and axial separations substantially as follows:

| Surface | Radius of Curvature | Axial Separation |
|---|---|---|
| R1 | −34.03 | |
| | | 6.01 |
| R2 | −33.47 | |
| | | 0.50 |
| R3 | 323.76 | |
| | | 5.71 |
| R4 | −313.25 | |
| | | 0.50 |
| R5 | 50.37 | |
| | | 9.91 |
| R6 | 43.79 | |
| | | 111.76 |
| R7 | −563.83 | |
| | | 3.81 |
| R8 | −1118.60 | |
| | | 4.32 |
| R9 | −183.70 | |
| | | 5.64 |
| R10 | −117.49 | |
| | | Variable |
| R11 | 1839.79 | |
| | | 5.51 |
| R12 | −443.25 | |
| | | Variable |
| R13 | −173.46 | |
| | | 2.50 |
| R14 | 490.58 | |
| | | 5.01 |
| R15 | −157.56 | |
| | | 2.50 |
| R16 | −301.47 | |
| | | Variable |
| R17 | −255.55 | |
| | | 19.04 |
| R18 | −188.47 | |

19. An infra-red afocal telescope according to claim 17 having lens elements from the back of the objective zoom lens of the telescope to the front with refractive surfaces R1 to R18 of spherical curvature with radii of curvature and axial separations substantially as follows:

| Surface | Radius of Curvature | Axial Separation |
|---|---|---|
| R1 | −33.71 | |
| | | 6.00 |
| R2 | −33.71 | |
| | | 0.50 |
| R3 | PLANO | |
| | | 5.72 |
| R4 | −164.59 | |
| | | 0.50 |
| R5 | 50.19 | |
| | | 9.82 |
| R6 | 44.98 | |
| | | 112.70 |
| R7 | −541.84 | |
| | | 3.80 |
| R8 | −1125.89 | |
| | | 3.64 |
| R9 | −170.87 | |
| | | 5.50 |
| R10 | −112.72 | |
| | | Variable |
| R11 | 3661.53 | |
| | | 5.30 |
| R12 | −384.81 | |
| | | Variable |
| R13 | −188.25 | |
| | | 2.50 |
| R14 | 376.86 | |
| | | 5.97 |
| R15 | −130.81 | |
| | | 3.50 |
| R16 | −218.43 | |
| | | Variable |
| R17 | −260.31 | |
| | | 18.00 |
| R18 | −188.25 | |

20. An infra-red afocal telescope according to claim 17 having lens elements from the back of the objective lens of the telescope to the front with refractive surfaces R1 to R18 of spherical curvature with radii of curvature and axial separations substantially as follows:

| Surface | Radius of Curvature | Axial Separation |
|---|---|---|
| R1 | −37.54 | |
| | | 4.95 |
| R2 | −36.25 | |
| | | 0.38 |

-continued

| Surface | Radius of Curvature | Axial Separation |
|---|---|---|
| R3 | −218.10 | |
| | | 4.45 |
| R4 | −116.37 | |
| | | 0.38 |
| R5 | +52.18 | |
| | | 5.08 |
| R6 | +66.34 | |
| | | 59.97 |
| R7 | −71.63 | |
| | | 2.54 |
| R8 | −153.81 | |
| | | 28.12 |
| R9 | −100.72 | |
| | | 5.08 |
| R10 | −68.34 | |
| | | Variable |
| R11 | +3234.22 | |
| | | 4.98 |
| R12 | −361.73 | |
| | | Variable |
| R13 | −176.05 | |
| | | 2.35 |
| R14 | +347.35 | |
| | | 5.61 |
| R15 | −125.10 | |
| | | 3.29 |
| R16 | −204.69 | |
| | | Variable |
| R17 | −244.76 | |
| | | 17.40 |
| R18 | −177.07 | |

21. An infra-red afocal telescope according to claim 17 having lens elements from the back of the objective lens of the telescope to the front with refractive surfaces R1 to R18 of spherical curvature with radii of curvature and axial separations substantially as follows:

| Surface | Radius of Curvature | Axial Separation |
|---|---|---|
| R1 | −60.03 | |
| | | 4.95 |
| R2 | −48.51 | |
| | | 0.38 |
| R3 | +163.75 | |
| | | 4.32 |
| R4 | +1442.83 | |
| | | 0.38 |
| R5 | +38.45 | |
| | | 3.94 |
| R6 | +41.63 | |
| | | 55.68 |
| R7 | −45.15 | |
| | | 2.92 |
| R8 | −97.71 | |
| | | 5.80 |
| R9 | −55.77 | |
| | | 3.30 |
| R10 | −39.47 | |
| | | Variable |
| R11 | +193.26 | |
| | | 4.32 |
| R12 | −209.20 | |
| | | Variable |
| R13 | −87.84 | |
| | | 4.29 |
| R14 | +153.02 | |
| | | 3.68 |
| R15 | −48.09 | |
| | | 2.54 |
| R16 | −80.31 | |
| | | Variable |
| R17 | −121.13 | |
| | | 11.68 |
| R18 | −90.01 | |

* * * * *